(12) United States Patent
Ito

(10) Patent No.: US 7,871,254 B2
(45) Date of Patent: Jan. 18, 2011

(54) MAGNETIC BEARING AND COUPLING DEVICE

(75) Inventor: Hiroshi Ito, Yokohama (JP)

(73) Assignee: Anest Iwata Corporation, Yokohama (JP)

( * ) Notice: Subject to any disclaimer, the term of this patent is extended or adjusted under 35 U.S.C. 154(b) by 409 days.

(21) Appl. No.: 12/144,774

(22) Filed: Jun. 24, 2008

(65) Prior Publication Data

US 2009/0004037 A1 Jan. 1, 2009

(30) Foreign Application Priority Data

Jun. 29, 2007 (JP) .............................. 2007-171955

(51) Int. Cl.
*F01C 1/02* (2006.01)
*F04C 25/02* (2006.01)
*F04C 18/02* (2006.01)

(52) U.S. Cl. .................... 418/55.3; 418/55.1; 310/90.5; 464/29; 417/420

(58) Field of Classification Search ................ 418/55.1, 418/55.3; 310/90.5, 75 D; 464/29; 417/420
See application file for complete search history.

(56) References Cited

U.S. PATENT DOCUMENTS

| | | | | |
|---|---|---|---|---|
| 6,149,405 A | * | 11/2000 | Abe et al. ................... | 418/55.2 |
| 6,551,075 B2 | * | 4/2003 | Gabrieli et al. ............. | 417/420 |
| 7,262,531 B2 | * | 8/2007 | Li et al. ...................... | 310/90.5 |
| 7,800,268 B2 | * | 9/2010 | Sun et al. ................... | 310/90.5 |

FOREIGN PATENT DOCUMENTS

JP 11-044297 2/1999

* cited by examiner

*Primary Examiner*—Thomas E Denion
*Assistant Examiner*—Mary A Davis
(74) *Attorney, Agent, or Firm*—Polsinelli Shughart PC

(57) ABSTRACT

A follower shaft is rotatably supported coaxially with a driving shaft. An inner rotary permanent magnet having poles in a radial direction is fixed around an outer circumference of the end of the follower shaft. On the inner circumferential surface of a cylindrical coupling, an outer rotary permanent magnet is fixed such that opposite poles face each other between the inner rotary permanent magnet and the outer rotary permanent magnet. A fixed permanent magnet is fixed such that like poles face each other between the fixed permanent magnet and the inner rotary permanent magnet. Thus, rotation of the driving shaft is transmitted to the follower shaft without contact.

4 Claims, 4 Drawing Sheets

MAGNETIC BEARING AND COUPLING DEVICE

BACKGROUND OF THE INVENTION

The present invention relates to a magnetic bearing and coupling device and a scroll fluid machine including the same.

Scroll fluid machines such as vacuum pumps and compressors for treating toxic gases require that a gas does not leak from gas circulating paths for environmental protection. To meet the requirements, JP11-44297A discloses a magnetic coupling device in which the axial end of the eccentric shaft for supporting the orbiting scroll of the scroll fluid machine is covered with the cover, magnetic attractive force of the permanent magnets acting through the cover between the motor shaft and the eccentric shaft to allow the rotation of the motor shaft to be transmitted to the eccentric shaft without contact.

It is also necessary to reduce heat in the bearing of the eccentric shaft in view of operating efficiency. Thus, instead of a bearing in sliding contact with the outer circumferential surface of the eccentric shaft, it would be preferable to use a magnetic coupling that can support the eccentric shaft by magnetic repulsive force of magnets without contact.

However, when the magnetic bearing is used together with the magnetic coupling device as mentioned above, it would be necessary to install a number of permanent magnets for the magnetic bearing and magnetic coupling thereby increasing manufacturing costs. When the magnetic bearing is installed close to the magnetic coupling device, magnetic forces would affect each other to decrease its performance.

SUMMARY OF THE INVENTION

In view of the disadvantages, it is an object of the invention to provide a magnetic bearing and coupling device in which permanent magnets are reduced in number to enable the rotation of a driving shaft to be transmitted to a follower shaft without contact, the driving shaft or follower shaft being rotatably supported without contact.

It is another object of the invention to provide a scroll fluid machine including the magnetic bearing and magnetic coupling device.

BRIEF DESCRIPTION OF THE DRAWINGS

The features and advantages of the invention will become more apparent from the following description with respect to an embodiment as shown in accompanying drawings.

DETAILED DESCRIPTION OF PREFERRED EMBODIMENT

Figure 1:
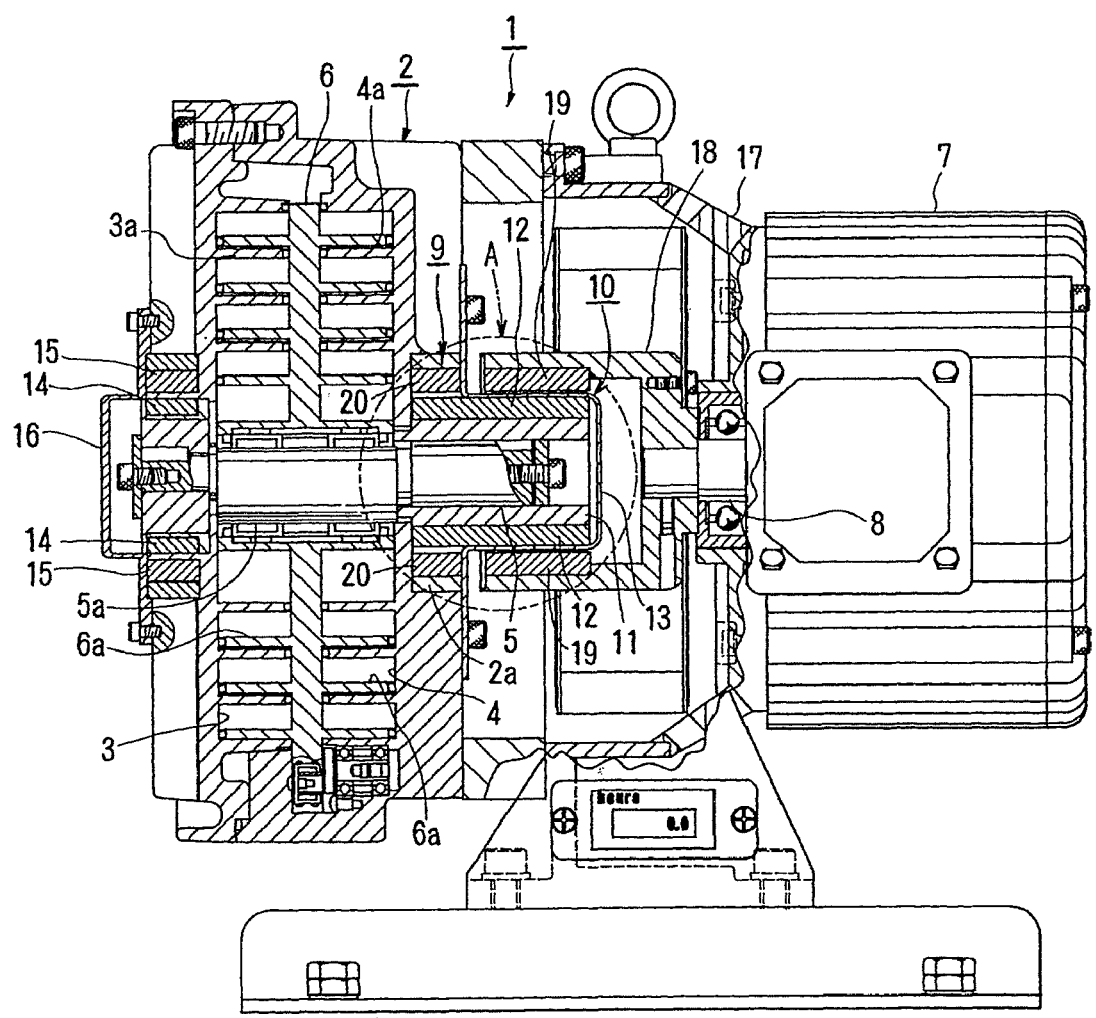
FIG. 1 is a vertical sectional view of an embodiment of a scroll fluid machine according to the present invention.
Figure 2:
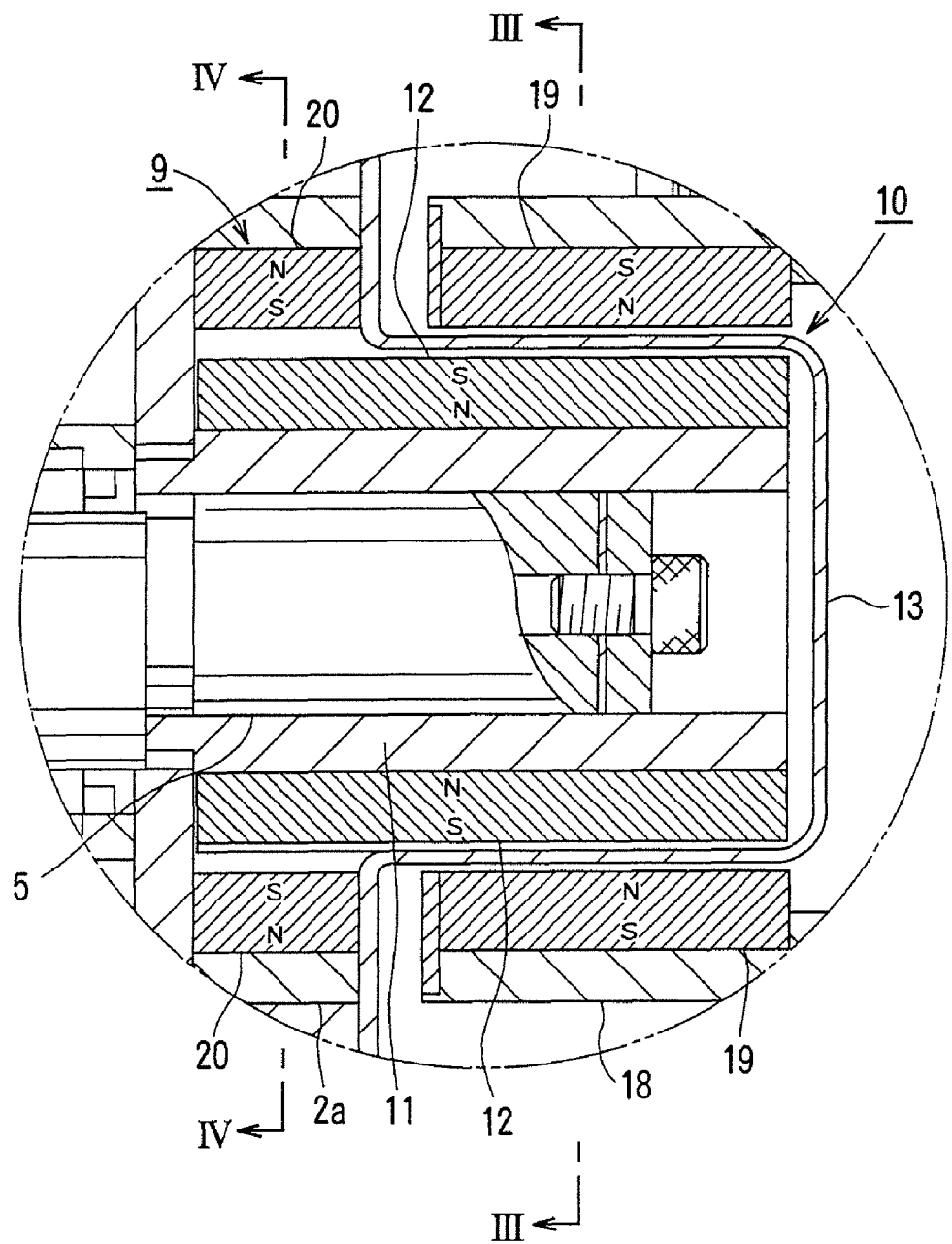
FIG. 2 is an enlarged view of the part A in FIG. 1.

In FIG. 1, a scroll fluid machine 1 comprises fixed scrolls 3,4 and an orbiting scroll 6 rotatably supported around an eccentric axial portion 5a of a follower shaft 5. Fixed wraps 3a,4a of the fixed scroll 3,4 engage with spiral orbiting wraps 6a,6a of the orbiting scroll 6. With rotation of the follower shaft 5, the orbiting scroll 6 revolves with respect to the fixed scrolls 3,4 to allow a gas to be introduced via an inlet (not shown) in the circumference of a housing 2 and to be discharged from an outlet (not shown) in the center of the housing 2.

A motor 7 is connected to the rear part of the housing 2. Rotation is transmitted from a driving shaft 8 of the motor 7 to the follower shaft 5

Figure 5:
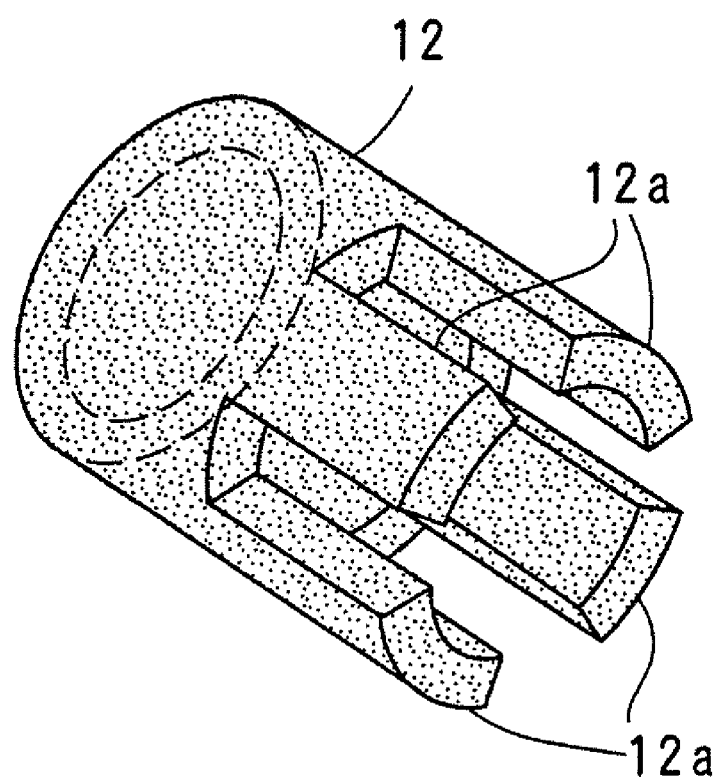
FIG. 5 is a perspective view of an inner rotary permanent magnet.

An annular support 11 is fixed to the rear end of the follower shaft 5 projecting from the rear surface of the housing 2. An inner rotary permanent magnet 12 having an axial length is fixed on the outer circumferential surface of the annular support 11. In FIG. 5, the inner rotary permanent magnet 12 is cylindrical and magnetized radially such that the outer and inner circumferences are S- and N-poles respectively. A front half of the inner rotary permanent magnet 12 constitutes part of a magnetic bearing 9 and is formed as a ring to allow uniform magnetic repulsive force between fixed annular permanent magnets 20 and 20 (later described). A rear half of the magnet 12 constitutes part of a magnetic coupling 10 and comprises four arms 12a spaced circumferentially at regular intervals to allow strong attractive force to be generated circumferentially between outer rotary permanent magnets 19 (later described).

The rear end of the follower shaft 5, annular support 11 and inner rotary permanent magnet 12 are covered with a cover 13 fixed to the housing 2 in an airtight manner. The cover 13 may be made of non-magnetic material such as Al. The cover 13 seals surroundings around an axial part to which the follower shaft 5 is rotatably mounted, thereby preventing a gas from leaking to the outside even if the gas introduced in the housing 2 leaks from the axial part of the follower shaft 5. The front end of the follower shaft 5 is rotatably supported with a magnetic bearing that comprises a rotary permanent magnet 14 fixed on the outer circumference of the follower shaft 5 and a fixed permanent magnet 14 fixed to the housing 2 without contacting the housing so that like poles face each other between the magnets 14 and 15. The front end of the follower shaft 5 is covered with a cover 16 as well as the rear end.

The motor 7 is fixed to the rear end of the housing 2 via an outer cover 17 to allow the driving shaft 8 to extend coaxially with the follower shaft 5. A cylindrical coupling 18 is fixed to the front end of the driving shaft 8.

Figure 3:
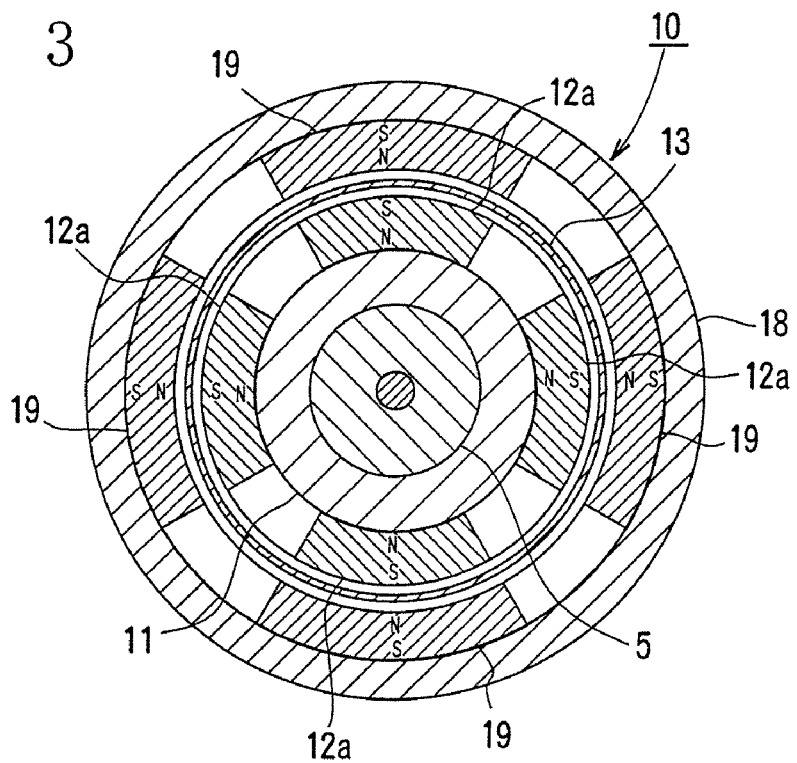
FIG. 3 is a vertical sectional view taken along the line III-III in FIG. 2.

In FIG. 3, four outer rotary permanent magnets 19 are fixed on the inner circumferential surface of the coupling 18 and equally spaced circumferentially to face the outer circumferential surface of the cover 13 with a very small gap. Each of the outer rotary permanent magnets 19 constitutes a magnetic coupling device 10 with each arm 12a of the inner rotary permanent magnet 12 to enable the rotation of the driving shaft 8 to be transmitted to the follower shaft without contact. Each of the permanent magnets 19 is placed to face each of the arms 12a in opposite poles at each side of the cover 13.

Figure 4:
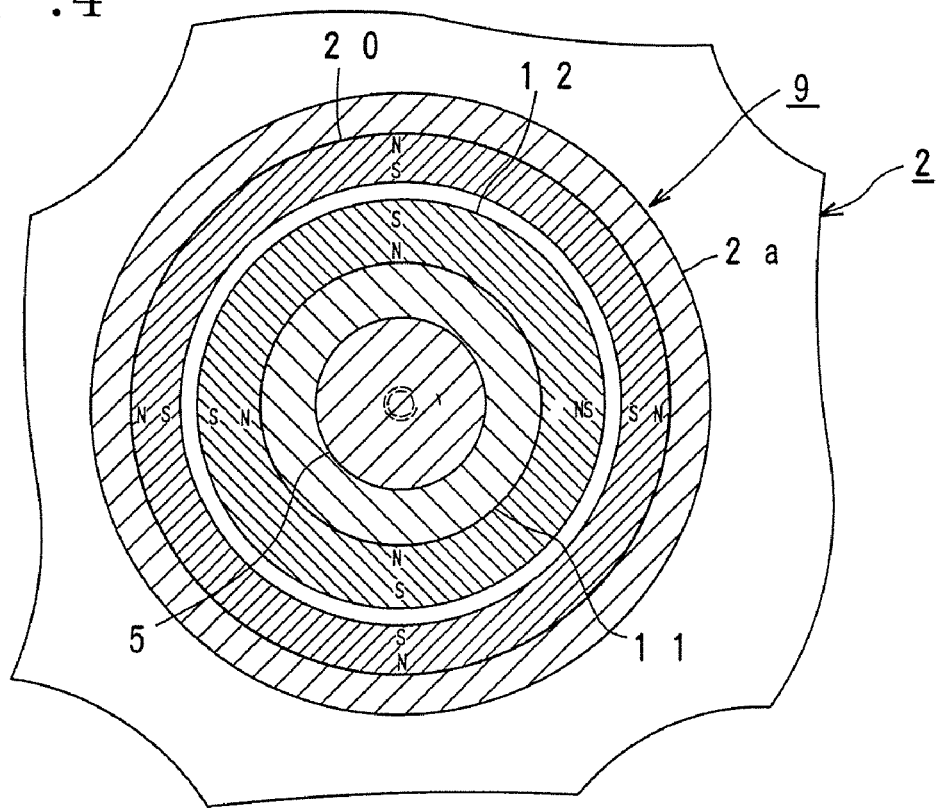
FIG. 4 is a vertical sectional view taken along the line IV-IV in FIG. 2.

In FIG. 4, an annular fixed permanent magnet 20 is fixed to the annular support 2a of the housing 2 around a front part of the inner rotary permanent magnet 12 to allow like poles to face each other. The fixed permanent magnet 20 and annular part of the inner rotary permanent magnet 12 constitute the magnetic bearing 9 that rotatably supports the follower shaft 5 within the annular support 2a of the housing 2 without contact.

As mentioned above, between the driving shaft 8 and the follower shaft 5, mutual magnetic attractive force radially acts between the inner rotary permanent magnet 12 and the outer rotary permanent magnet 19 of the magnetic coupling device 10. Thus, the rotation of the driving shaft 8 can be transmitted to the follower shaft 5 by the magnetic attractive force without contact. Between the outer circumferential surface of the follower shaft 5 and the annular support 2a of the housing 2, mutual magnetic repulsive force radially acts between the annular inner rotary permanent magnet 12 and the annular fixed permanent magnet 20 of the magnetic bearing 9. By the magnetic repulsive force, the follower shaft 5 can be rotatably supported within the annular support 2a of the housing 2 without contact.

The inner rotary permanent magnet 12 is used in both the magnetic bearing 9 and the magnetic coupling device 10 thereby reducing the number of permanent magnets and manufacturing cost. Furthermore, magnetic forces of permanent magnets can be less influenced and performance of the magnetic bearing 9 and magnetic coupling device 10 cannot be decreased. In the embodiment, the magnetic bearing 9 and magnetic coupling device 10 are used in the scroll fluid machine 1 to prevent a gas from leaking from the housing 2 securely. Heat generated from the follower shaft 6 during rotation can be reduced to enable the scroll fluid machine 1 to be operated more efficiently.

In the embodiment above, the magnetic bearing 9 and magnetic coupling device 10 are employed in the scroll fluid machine 1, but may be used in other machines, connecting part of a driving shaft and a follower shaft, and a annular support thereof. The inner rotary permanent magnet 12 can be installed on the driving shaft 8 and the outer rotary permanent 19 can be installed on the follower shaft 5. The driving shaft 8 may be rotatably supported with the magnetic bearing 9 without contact.

The foregoing merely relates to an embodiment of the invention. Various changes and modifications may be made by a person skilled in the art without departing from the scope of claims wherein:

What is claimed is:

1. A magnetic bearing and coupling device comprising:
    a drive shaft coaxial with a follower shaft;
    an inner rotary permanent magnet having polarity in a radial direction, the inner permanent magnet being fixed to an outer circumference of a first end of either one of the driving shaft or the follower shaft to rotatably support the first end;
    a cylindrical coupling fixed to a second end of the other one of the driving shaft or the follower shaft;
    an outer rotary permanent magnet fixed to an inner circumference of the cylindrical coupling, opposite poles facing each other between the outer rotary permanent magnet and the inner rotary permanent magnet to allow rotation of the driving shaft to be transmitted to the follower shaft without contact by magnetic attractive force owing to the opposite poles between the outer rotary permanent magnet and the inner rotary permanent magnet;
    an annular support fixed in a housing; and
    a fixed permanent magnet fixed in the annular support to allow the driving shaft or the follower shaft to be rotatably supported around the inner rotary permanent magnet, like poles facing each other between the inner rotary permanent magnet and the fixed permanent magnet to allow the driving shaft or the follower shaft to be rotatably supported without contact to the housing by repulsive force owing to the like poles between the inner rotary permanent magnet and the fixed permanent magnet.

2. A magnetic bearing and coupling device of claim 1 the inner rotary permanent magnet that faces the fixed permanent magnet is annular.

3. A magnetic and coupling device of claim 1 wherein a cover made of non-magnetic material is provided between the inner rotary permanent magnet and the outer rotary permanent magnet to prevent a gas introduced in the housing from leaking to the outside.

4. A scroll fluid machine comprising:
    a fixed scroll having a fixed wrap;
    an orbiting scroll having an orbiting wrap that engages with the fixed wrap;
    a driving shaft;
    a follower shaft driven by the driving shaft to allow the orbiting scroll to revolve with respect to the fixed scroll;
    an annular support fixed in the fixed scroll; and
    a magnetic bearing and coupling device comprising an inner rotary permanent magnet having polarity in a radial direction, the inner permanent magnet being fixed to an outer circumference of a first end of either one of the driving shaft or the follower shaft to rotatable support the first end around an axis, a cylindrical coupling fixed to a second end of the other one of the driving shaft or the follower shaft, an outer rotary permanent magnet fixed to an inner circumference of the cylindrical coupling, opposite poles facing each other between the outer rotary permanent magnet and the inner rotary permanent magnet to allow rotation of the driving shaft to be transmitted to the follower shaft without contact by magnetic attractive force owing to the opposite poles between the outer rotary permanent magnet and the inner rotary permanent magnet, an annular support in the fixed scroll, and a fixed permanent magnet fixed in the fixed scroll to allow the driving shaft or the follower shaft to be rotatably supported around the inner rotary permanent magnet, like poles facing each other between the inner rotary permanent magnet and the fixed permanent magnet to allow the driving shaft or the follower shaft to be rotatably supported without contact to the housing by repulsive force owing to the like poles between the inner rotary permanent magnet and the fixed permanent magnet.

* * * * *